(12) United States Patent
Protz

(10) Patent No.: US 10,197,885 B2
(45) Date of Patent: Feb. 5, 2019

(54) ILLUMINATION DEVICE AND METHOD FOR CONTROLLING THE ILLUMINATION DEVICE

(71) Applicant: MBDA Deutschland GmbH, Schrobenhausen (DE)

(72) Inventor: Rudolf Protz, Hoehenkirchen-Siegertsbrunn (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 517 days.

(21) Appl. No.: 14/256,237

(22) Filed: Apr. 18, 2014

(65) Prior Publication Data

US 2014/0313569 A1 Oct. 23, 2014

(30) Foreign Application Priority Data

Apr. 19, 2013 (DE) .................. 10 2013 006 813

(51) Int. Cl.
*G02F 1/33* (2006.01)
*G02B 27/48* (2006.01)
*G01S 7/481* (2006.01)
*G01S 17/89* (2006.01)
*G01S 17/10* (2006.01)

(52) U.S. Cl.
CPC .............. *G02F 1/33* (2013.01); *G01S 7/4814* (2013.01); *G02B 27/48* (2013.01); *G01S 17/107* (2013.01); *G01S 17/89* (2013.01)

(58) Field of Classification Search
CPC ....................................................... G02F 1/33

USPC ......................................... 359/310, 298, 305
See application file for complete search history.

(56) References Cited

U.S. PATENT DOCUMENTS

| 4,516,853 A | 5/1985 | Pearson |
| 8,891,170 B2* | 11/2014 | Tanaka .......................... 359/623 |
| 2002/0154375 A1 | 10/2002 | Roddy et al. |
| 2007/0188417 A1* | 8/2007 | Hajjar .................. G02B 26/101 345/75.1 |
| 2009/0213350 A1 | 8/2009 | Sogard |
| 2012/0218615 A1 | 8/2012 | Yasuda |
| 2013/0003343 A1 | 1/2013 | Sudarshanam et al. |

FOREIGN PATENT DOCUMENTS

| DE | 43 35 070 A1 | 8/2003 |
| JP | 2011-128639 A | 6/2011 |

OTHER PUBLICATIONS

German Office Action issued in German counterpart application No. 10 2013 006 813.4 dated Mar. 21, 2014 (Six (6) pages).

(Continued)

*Primary Examiner* — Jack Dinh
(74) *Attorney, Agent, or Firm* — Crowell & Moring LLP

(57) ABSTRACT

An illumination device for illuminating a target to be combated includes a laser light source for emitting light along a beam path, a first modulator in the beam path and configured to manipulate a direction of the beam path in a first plane, a phase plate in the beam path having a variety of different optical thicknesses, and a control device connected to the light source and the first modulator and is configured to activate the first modulator using different frequencies, so that the beam path is deflected over a control period of time up to a first angle.

12 Claims, 2 Drawing Sheets

(56) References Cited

OTHER PUBLICATIONS

Figure 1:
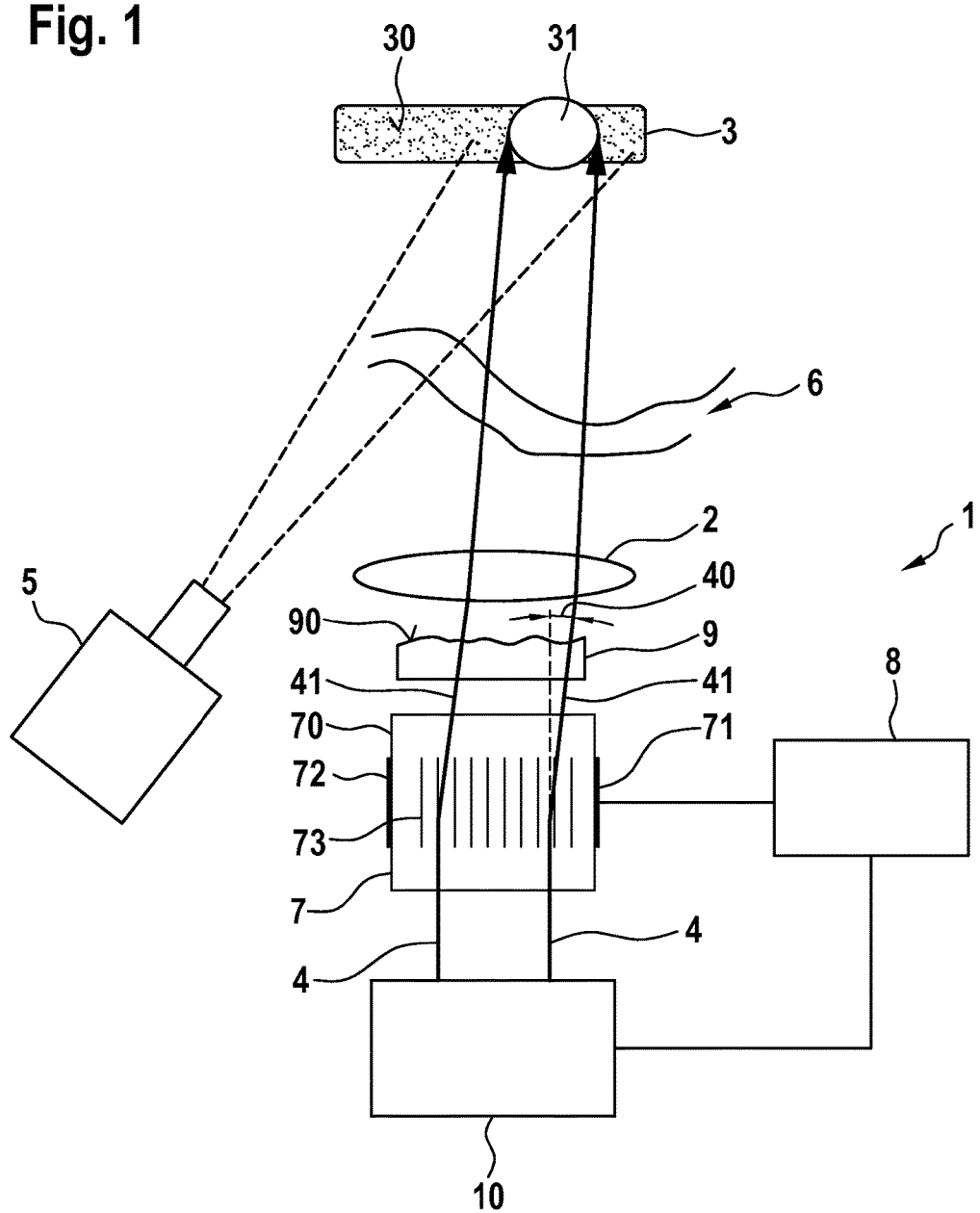

European Search Report issued in European counterpart application No. 14 001 250.1 dated Sep. 30, 2014, with partial English translation (Ten (10) pages).
Singaporean Written Opinion issued in Singaporean counterpart application No. 10201401449W dated Jun. 30, 2016 (Six (6) pages).
Singaporean Written Opinion issued in Singaporean counterpart application No. 10201401449W dated Jan. 31, 2017 (Six (6) pages).
Oxford et al., "<title>Comparison of speckle reduction techniques on the identification of human activities in laser range-gated SWIR imaging,/title>", Proceedings of SPIE, vol. 7662, Apr. 21, 2010, p. 766206, XP055134802.
Driggers et al., "Impact of spackle on laser range-gated shortwave infrared imaging system target identification performance", Optical Engineering, Mar. 7, 2003, p. 738, XP055134790.

\* cited by examiner

ILLUMINATION DEVICE AND METHOD FOR CONTROLLING THE ILLUMINATION DEVICE

CROSS-REFERENCE TO RELATED APPLICATIONS

The present application claims priority under 35 U.S.C. § 119 to German Patent Application No. 10 2013 006 813.4, filed Apr. 19, 2013, the entire disclosure of which is herein expressly incorporated by reference.

BACKGROUND AND SUMMARY OF THE INVENTION

Exemplary embodiments of the present invention relate to an illumination device and a method for illuminating a target using this illumination device.

Multiple active laser target illumination devices and also laser target illumination methods are known from the prior art, in which a target object is illuminated by laser radiation. In particular, the range gating method is known, in which pulsed laser radiation is used to illuminate a target surface, so that suitable cameras can register the reflected radiation of this illumination. Due to the pulsing of the laser radiation it is possible to determine a distance to the target surface. Furthermore, the laser target illumination is used in the prior art in active optical tracking methods of rapidly moving targets.

However, as a result of the coherence of the laser radiation typically used in laser target illumination and the effect of the atmospheric turbulence occurring on the beam path and also the non-ideal flat surface structure of the target, interference-related disturbances can occur, which are also called speckle effects. These speckle effects arise due to strong local intensity variations of the reflected light, which strongly decreases the image quality. Such a decreased image quality makes subsequent electronic analysis more difficult and often makes an optical tracking method impossible.

Exemplary embodiments of the present invention are directed to an illumination device that allows a high image quality of the illuminated objects with simple and cost-effective production and assembly and with reliable and low-maintenance operation. Exemplary embodiments of the present invention are also directed to a method for illuminating a target that allows the recording of high-quality images of an illuminated object with simple and cost-effective application.

Exemplary embodiments of the present invention thus provide an illumination device suitable for illuminating a target to be combated. The illumination device according to the invention comprises a light source, which is preferably a laser light source. The light source is configured to emit light along a beam path. Furthermore, a first modulator is introduced into the beam path, wherein the modulator is configured to manipulate a direction of the beam path in a first plane. It is therefore preferably provided that the modulator can deflect the light radiation originating from the light source by a predefined angle. In particular, it is provided that the first modulator is an active optical element. In addition, a phase plate is provided in the beam path, which has a variety of optical thicknesses. The phase plate is preferably arranged downstream of the first modulator, so that the light of the light source can initially be deflected by the modulator before it is incident on the phase plate. The variety of different optical thicknesses of the phase plate can preferably be implemented in that the phase plate has an uneven surface. Therefore, preferably statistically distributed optical path differences of the light arise within the beam path. It is particularly preferred that these optical path differences on average make up small fractions of the wavelength of the light emitted by the light source. A control device is connected to the light source and the first modulator, so that the control device can activate the first modulator using different frequencies. In this manner, the beam path can be deflected over a first control period of time up to a first angle. The extent of the first duration and the first angle can be individually established by the control device. However, it is particularly preferably provided that the first angle is at most 5 millirad, while the control period of time is in the range from 1 to 10 ns (inclusive).

Preferably the light source emits light pulses. It is particularly preferred that a light pulse has the duration of the control period of time, so that the first modulator can be activated synchronously to the emission of light pulses. In this manner, it is advantageously possible to deflect each of the emitted light pulses up to a predetermined angle. A broad scattering of the illumination is therefore possible. Alternatively, it is also particularly preferred that the light source emits multiple light pulses during the control period of time. In any case, it is particularly preferred that at least one complete light pulse is emitted during the control period of time. It is therefore preferably ensured that each light pulse can be deflected completely by the first modulator.

Furthermore, it is preferable that the first modulator is an acousto-optical modulator. The first modulator is particularly preferably a Bragg cell. Therefore, the first modulator comprises a transparent carrier material, through which a wave, in particular an acoustic wave, is conducted. Different optical densities arise within the carrier material due to the acoustic wave, so that a diffraction of the beam path can be executed on an optical lattice resulting from the different optical densities. The beam path can be manipulated in this manner. The degree of the deflection can be varied by the activation of the first modulator using various frequencies, which means the emission of different sound waves. It is therefore preferably possible to design the manipulation of the beam path to be greatly variable. The first modulator is particularly preferably activated using frequencies of at least 100 MHz.

The difference of the optical thicknesses and the beam plate advantageously has a value that does not fall below 1 µm, in particular 5 µm. Alternatively or additionally, it is preferably provided that the value of the difference of the variety of the optical thicknesses of the beam plate does not exceed 50 µm, particularly preferably 10 µm. Therefore, the beam path deflected by the first modulator can pass various optical thicknesses of the beam plate, wherein statistically distributed optical path differences arise due to the various optical thicknesses. It is nonetheless ensured by the above-mentioned values of the differences of the optical thicknesses that these path differences are on average small fractions of the laser wavelength, which represents optimum conditions for effective target illumination.

In an advantageous embodiment of the invention, the illumination system comprises a second modulator, which is implemented as identical to the first modulator. The second modulator is preferably configured to manipulate a direction of the beam path in a second plane. The second plane is arranged in particular perpendicularly to the first plane. The use of the second modulator therefore advantageously allows the beam path to be deflected in all spatial directions.

The variety of the possible deflection directions can therefore be increased, which allows an effective variation of the path differences of the light.

Furthermore, the illumination device preferably has an optical sensor, which can be a camera. The optical sensor is preferably configured to detect the light emitted by the light source and reflected from the target. Since the light source emits light pulses, it is furthermore particularly preferable that a determination of a distance of the target to the illumination device is possible by means of the detection of the reflected light pulses by the optical sensor.

The illumination device according to the invention as described above allows an effective reduction of the speckle effect described above. The beam path is conducted through various optical thicknesses of the beam plate by the deflection of the beam path by means of the first modulator. Therefore, as already described, statistically distributed optical path differences arise. In this manner, it is possible to generate local and chronological variations of the phase fronts of the emitted light pulses in the cross-section of the beam path. Interactions with atmospheric disturbances or a non-ideal flat target surface can therefore result in chronologically and locally varying speckle effects. It is possible by way of a time averaging of these local and chronological variations to reduce the influence of the speckle effect on the overall measurement.

Furthermore, the illumination device according to the invention or according to a preferred refinement of the invention allows an illumination of the target in which an intensity profile over the beam path is similar to a plateau. In contrast thereto, in conventional illumination devices, a Gaussian distribution would occur, wherein the intensity decreases toward the edge of the beam path. Therefore, the illumination device according to the invention allows uniform and therefore optimized illumination of the target.

The invention furthermore relates to a method for illuminating a target, wherein an illumination device having the above-described features is used. According to the invention, the following steps are executed in the specified sequence: First a light pulse is emitted by the light source. Subsequently, the first modulator and/or the second modulator is activated in such a manner that the light pulse just emitted is deflected in a randomly determined direction. The light pulse therefore runs through a randomly determined region of the phase plate, so that statistically distributed optical path differences arise over the cross-section of the beam path. The light pulse thus manipulated is preferably oriented onto the target, so that it can illuminate the target.

In one preferred embodiment, the above-mentioned steps are executed in continuous repetition. It is therefore particularly preferably provided that the light source continuously emits light pulses, wherein the light pulses are deflected in randomly determined directions. Therefore, the above-described chronological and spatial variation of the phase front distribution results over the cross-section of the beam path in the different emitted light pulses.

Furthermore, it is preferably provided that the additional following steps are executed: First, each emitted light pulse is received, which is performed in particular by the optical sensor. Subsequently, the intensities of the received light pulses are determined, wherein preferably the phase front distribution over the cross-section of the reflected beam path can also be determined. A chronological mean value of the intensity of each pulse is determined. In this manner, it is possible to reduce the influence of speckle effects, since the speckle effect is spatially and chronologically varied by way of the above-described emission of the light pulses and manipulation of the direction of the emitted light pulses. Finally, it is preferable that an image is generated from the averaged intensity data. This image allows in particular an optical tracking method to be carried out, using which a rapidly moving target can be tracked by an active unit, for example.

BRIEF DESCRIPTION OF THE DRAWING FIGURES

Figure 2:
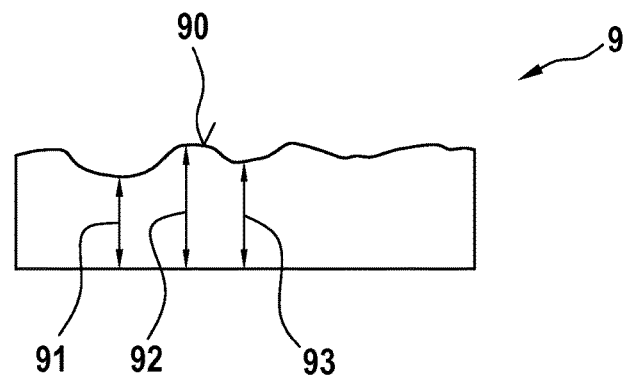
Figure 3:
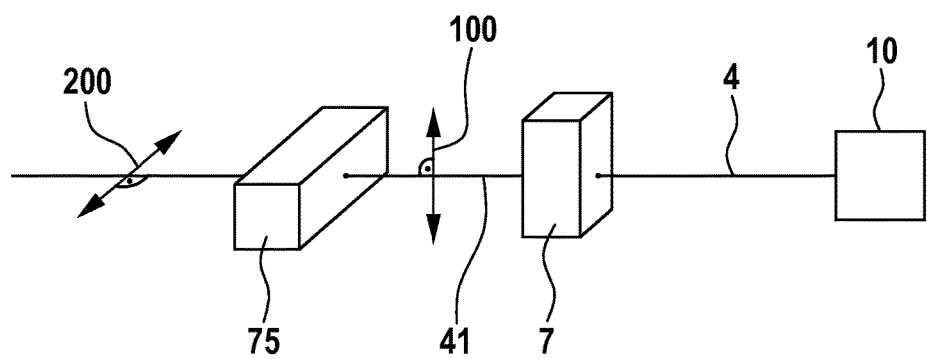

The invention will now be described in greater detail on the basis of exemplary embodiments with reference to the appended drawings. In the drawings:

FIG. 1 is a schematic illustration of the illumination device according to a first exemplary embodiment of the invention, FIG. 2 is a schematic illustration of the beam plate of the illumination device according to the first exemplary embodiment of the invention, and FIG. 3 is a schematic illustration of a part of the illumination device according to a second exemplary embodiment of the invention.

DETAILED DESCRIPTION

FIG. 1 shows an illumination device 1, which comprises a light source 10 that emits pulsed laser beams along a beam path 4. An optical system 2 focusses the beam path 4 on a target 3 to be illuminated. A target region 31 can be illuminated by the light source 10 in this manner.

A first modulator 7 and a phase plate 9 are arranged between the optical system 2 and the light source 10. The first modulator 7 is configured to deflect the beam path 4, so that the deflected beam path 41 is incident on the phase plate 9. From the phase plate 9, the beam path 4 reaches the target 3 by way of the optical system 2.

A control device 8 is provided and is configured to activate the light source 10 and the first modulator 7 in chronological synchronization with one another. For this purpose, the first modulator 7 is an acousto-optical modulator having a main body 70, which is transparent to the beam path 4. On one edge of the main body 70, an acoustic, in particular an ultrasound-based actuator 71 is attached, which can transmit an acoustic wave 73 to an absorber attached to an opposing side of the main body 70. In particular, the acoustic wave 73 transmitted between actuator 71 and absorber 72 runs perpendicularly to the beam path 4. The acoustic wave 73 therefore generates different optical densities within the main body 70, so that the modulator 7 is capable of deflecting the beam path 4, since the beam path 4 can be diffracted by the resulting optical lattice. By establishing different frequencies of the acoustic wave 73, it is possible to determine a first angle 40, up to which the beam path 4 is deflected at maximum. The deflection angle 40 can be determined by the control device 8, wherein the control device 8 furthermore ensures that a complete light pulse of the light source 10 is always deflected. It is therefore preferable that the control device 8 establishes the duration of a light pulse on a control period of time, on the one hand, wherein the same control period of time is used to transmit the acoustic wave 73 through the main body 70. Alternatively, it is also preferable that the control device 8 emits multiple complete light pulses by way of the light source 10 during the control period of time.

The beam path 41 deflected by the first modulator 7 is incident on the phase plate 9. The phase plate 9 has a variety of optical thicknesses, which vary over a surface 90 of the phase plate 9. A more detailed view of the phase plate 9 is apparent from FIG. 2.

FIG. 2 shows the phase plate 9, wherein a first optical thickness 91, a second optical thickness 92, and a third optical thickness 93 are shown as examples. The first optical thickness 91, the second optical thickness 92, and the third optical thickness 93 result due to an irregular surface 90. The light must therefore cover optical paths of different lengths as a function of the position through which it passes through the phase plate 9.

As is apparent from FIG. 1, the first modulator 7 can force different paths through the phase plate 9 by the deflection of the beam path 4. Therefore, a chronological and spatial variation of the phase fronts arises over the cross-section of the deflected beam path 41. The light pulses thus varied are finally focused by the optical system 2 on the target 3.

However, it is possible that the light pulses are incident on atmospheric disturbances, which can result in phase shifts of the light pulses, between the optical system 2 and the target 3. Furthermore, a surface 30 of the target 3 cannot be ideally flat, so that phase shifts can also occur here. Therefore, disturbances in the form of speckle formations occur in the image of a camera 5, which can register reflected light radiation from the target 3. However, since the phase front distribution of the light pulses is chronologically and spatially varied over the cross-section of the beam path 4, as described above, the speckle effect also occurs in a chronologically and spatially varied manner. Therefore, the camera 5 can noticeably reduce the effects of the speckle effect by chronological averaging of the intensities of the received light radiation.

In particular, every light pulse can be deflected to scan an angle range extending from the deflected state up to the maximally deflected state at the first angle 40. The light pulse can preferably be deflected from the non-deflected state up to the first angle 40, to subsequently be deflected back into the non-deflected state. By scanning the described angle range, a variety of speckle effects arises, which are reduced or cancel out upon chronological averaging.

FIG. 3 shows a second exemplary embodiment of the invention, which represents an additional refinement of the first exemplary embodiment. For the sake of simplicity, only a part of the illumination device 1 is shown here. A light source 10 emits light pulses along the beam path 4, wherein the beam path 4 is firstly incident on the first modulator 7. The first modulator 7 is configured to deflect the beam path 4 in a first plane 100. The first plane 100 is shown as the vertical direction in FIG. 3. Subsequently, the deflected beam path 41 is incident on a second modulator 75, which is implemented identically to the first modulator 7. The second modulator 75 is preferably implemented in such a manner that it can deflect the deflected beam path 41 in a second plane 200. In FIG. 3, the second plane 200 is shown as the horizontal plane. It is therefore apparent that the first plane 100 and the second plane 200 are arranged perpendicularly to one another. It is therefore possible to deflect the beam path 4 of the light emitted by the light source 10 in all spatial directions, by combining the deflections of the first modulator 7 and the second modulator 75. A greater spatial and chronological variation of the speckle effect is therefore possible, whereby it can be reduced further. Overall, very high-quality data are therefore available about the illuminated target 3, so that these data are also suitable in particular for optical tracking methods.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS 1 illumination device
2 optical system
3 target
30 surface of the target
31 illuminated target region
4 beam path
40 first angle
41 deflected beam path
5 optical sensor
6 atmospheric disturbance
7 first modulator
70 main body
71 actuator
72 absorber
73 shaft
75 second modulator
8 control device
9 phase plate
90 surface of the phase plate
91 first optical thickness of the phase plate
92 second optical thickness of the phase plate
93 third optical thickness of the phase plate
10 light source
100 first direction
200 second direction

What is claimed is:

1. An illumination device for illuminating a target to be combated, comprising
    a laser light source configured to emit light along a beam path;
    a first modulator arranged in the beam path, wherein the first modulator is configured to manipulate a direction of the beam path in a first plane;
    a phase plate arranged in the beam path between the first modulator and the target to be combated, wherein the phase plate has a plurality of different optical thicknesses; and
    a control device connected to the light source and the first modulator,
    wherein the control device is configured to activate the first modulator for a period of time comprising at least one control period of time, using different frequencies so that, over the at least one control period of time, light radiation originating from the light source is deflected by a specific angle defined by a frequency of the first modulator used over the at least one control period of time, and wherein for each of the at least one control period of time a different frequency of the modulator is used.

2. The illumination device of claim 1, wherein the light source emits light pulses.

3. The illumination device of claim 2, wherein the light source emits at least one complete light pulse during the control period of time.

4. The illumination device of claim 1, wherein the first modulator is an acousto-optical modulator.

5. The illumination device of claim 4, wherein the acousto-optical modulator is a Bragg cell.

6. The illumination device of claim 1, wherein a difference of the plurality of the optical thicknesses of the beam plate does not fall below a value of 1 μm, in particular a value of 5 μm, and/or does not exceed a value of 50 μm, in particular a value of 10 μm.

7. The illumination device of claim 1, wherein a difference of the plurality of the optical thicknesses of the beam plate does not fall below a value of 5 μm.

8. The illumination device of claim 1, wherein a difference of the plurality of the optical thicknesses of the beam plate does not exceed a value of 50 μm.

9. The illumination device of claim 1, wherein a difference of the plurality of the optical thicknesses of the beam plate does not exceed a value of 10 μm.

10. The illumination device of claim 1, further comprising:
    a second modulator arranged between the first modulator and the target to be combatted,
    wherein the second modulator is configured to manipulate a direction of the beam path in a second plane,
    wherein the first plane and the second plane extend perpendicularly to one another.

11. The illumination device of claim 1, further comprising:
    an optical sensor configured to detect light radiation emitted by the light source and reflected from the target to be combatted.

12. The illumination device of claim 11, wherein the optical sensor is a camera.

* * * * *